(12) United States Patent
Aysan et al.

(10) Patent No.: US 7,379,465 B2
(45) Date of Patent: May 27, 2008

(54) TUNNELING SCHEME OPTIMIZED FOR USE IN VIRTUAL PRIVATE NETWORKS

(75) Inventors: Can C. Aysan, Nepean (CA); Ru C. Wadasinghe, Kanata (CA)

(73) Assignee: Nortel Networks Limited, St. Laurent, Quebec (CA)

(*) Notice: Subject to any disclaimer, the term of this patent is extended or adjusted under 35 U.S.C. 154(b) by 1247 days.

(21) Appl. No.: 10/005,328

(22) Filed: Dec. 7, 2001

(65) Prior Publication Data

US 2003/0108041 A1    Jun. 12, 2003

(51) Int. Cl.
*H04L 12/56* (2006.01)

(52) U.S. Cl. .................. 370/409; 370/392; 370/401; 370/469

(58) Field of Classification Search ........... 370/389, 370/392, 401–405, 409, 469
See application file for complete search history.

(56) References Cited

U.S. PATENT DOCUMENTS

| | | | |
|---|---|---|---|
| 6,226,751 B1 * | 5/2001 | Arrow et al. ................. 726/15 |
| 6,496,867 B1 * | 12/2002 | Beser et al. ................. 709/245 |
| 6,636,516 B1 * | 10/2003 | Yamano ................. 370/395.52 |
| 6,765,591 B2 * | 7/2004 | Poisson et al. ............. 715/735 |
| 2002/0038419 A1 * | 3/2002 | Garrett et al. .............. 713/154 |

\* cited by examiner

*Primary Examiner*—Chi Pham
*Assistant Examiner*—Donald L Mills
(74) *Attorney, Agent, or Firm*—Withrow & Terranova, PLLC

(57) ABSTRACT

A tunneling scheme includes the creation of tunnels having a source address and potentially multiple destination addresses. Each tunnel endpoint is divided into two sub-endpoints, where one sub-endpoint has a public network address and the other sub-endpoint has a private network address. Also included in the tunneling scheme is a static Address Resolution Protocol (ARP) table. The static ARP table contains information on virtual private network membership. More particularly, the static ARP table provides address resolution between public network addresses and private network addresses.

8 Claims, 10 Drawing Sheets

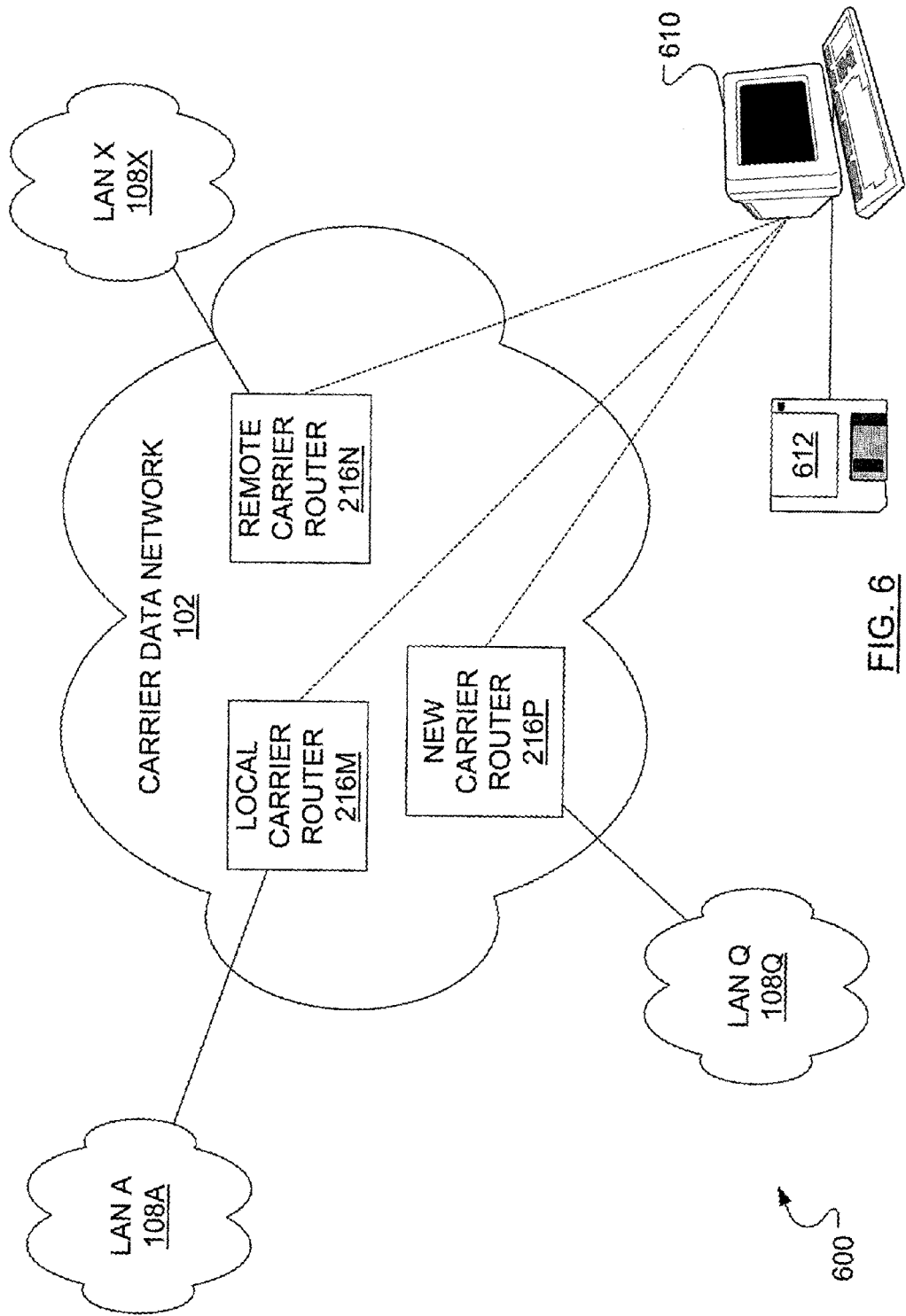

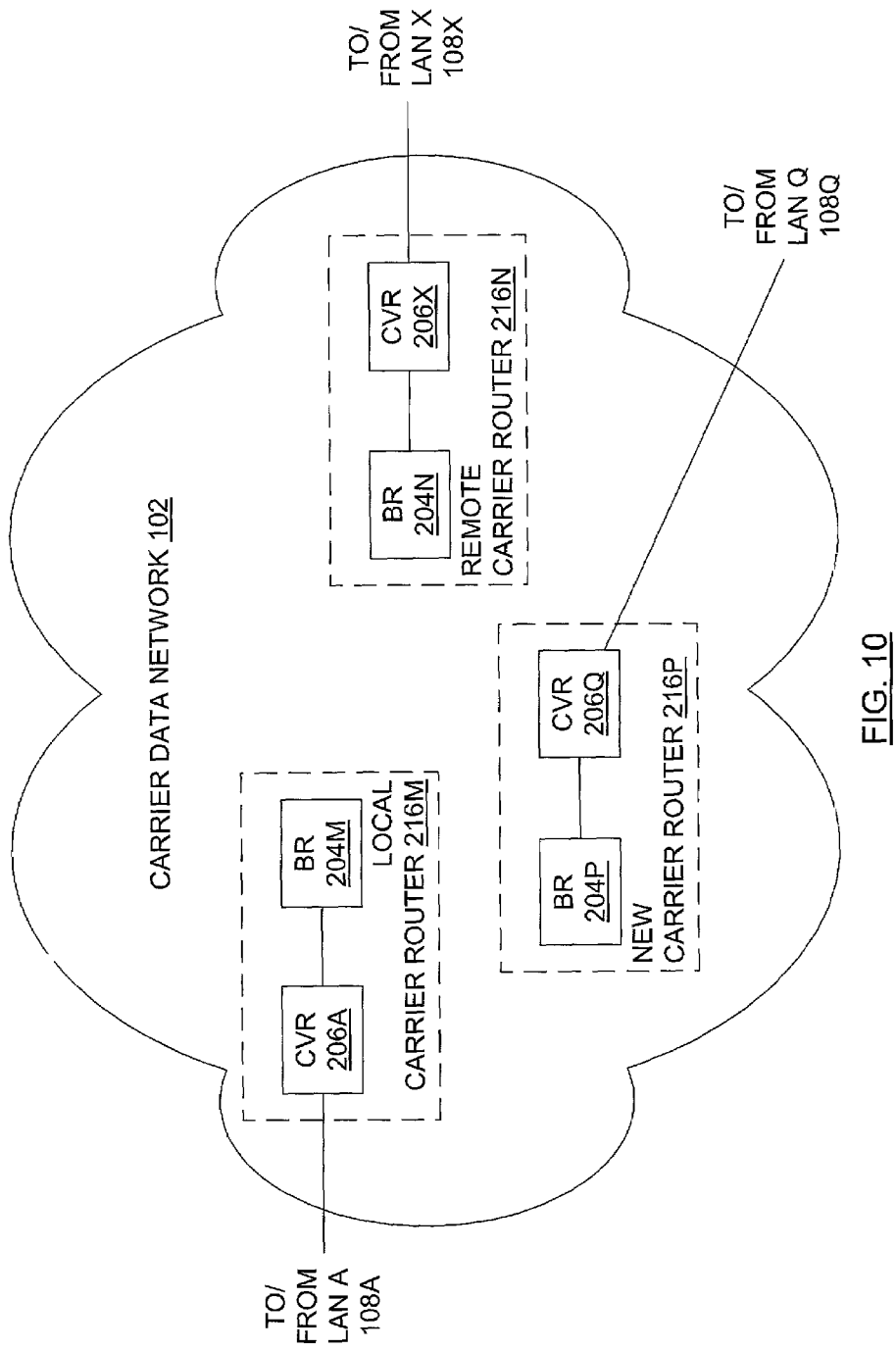

TUNNELING SCHEME OPTIMIZED FOR USE IN VIRTUAL PRIVATE NETWORKS

FIELD OF THE INVENTION

The present invention relates to virtual private networks provided within public data networks and, in particular, to a tunneling scheme optimized for use in virtual private networks.

BACKGROUND OF THE INVENTION

Traditionally, to securely connect geographically distributed private local area networks (LANs) of an enterprise to each other, hard-wired connections were leased from telecommunication companies, or at least an amount of guaranteed bandwidth on these connections. As well, to connect a single remote user to a private LAN, the remote user would dial in to a dedicated collection of modems, phone lines and associated network access servers. These private LANs are typically used for networking functions (e.g., e-mail, file sharing, printing) within an enterprise. Network connected devices within such a private LAN are not intended to be reachable by devices in other, unrelated networks. Increasingly, the use of Virtual Private Networks (VPNs) is replacing the use of leased hard-wired connections for providing links between LANs and the use of dedicated dial-up lines for providing remote users access to corporate intranets.

VPNs typically use a public data network, such as the Internet, to connect computer systems in private networks that are related to each other. Four critical functions have been identified as being necessary for VPNs to ensure security of data: authentication; access control; confidentiality; and data integrity. To meet these ends, while using a public data network which uses a protocol such the Internet Protocol (IP) for instance, the concept of "tunneling" has been successfully implemented.

Tunneling involves the encapsulation of a sender's data in IP packets. These encapsulated packets hide the underlying routing and switching infrastructure of the Internet from both senders and receivers. At the same time, these encapsulated packets can be protected against snooping by outsiders through the use of encryption techniques.

Tunnels can have two types of endpoints, where an endpoint may be either an individual computer or a LAN with a security gateway, which might be a carrier router or firewall. Only two cases of combinations of these end points, however, are usually considered in designing VPNs. In the first case, LAN-to-LAN tunneling, a security gateway at each end point serves as the interface between the tunnel and the private LAN. In such cases, users on either LAN can use the tunnel transparently to communicate with each other. The second case, that of client-to-LAN tunnels, is the type usually set up for a mobile user who wants to connect to a corporate LAN. The client, i.e., the mobile user, initiates the creation of the tunnel on his end in order to exchange traffic with the corporate LAN. To do so, he runs special client software on his computer to communicate with the gateway protecting the corporate LAN.

In particular, tunneling is described in K. Hamzeh, et al., "Point-to-Point Tunneling Protocol (PPTP)" Internet Engineering Task Force (IETF) Request for Comments (RFC) 2637, hereby incorporated herein by reference, which specifies a protocol that allows the known Point to Point Protocol (PPP) to be "tunneled" through an IP network. A client-server architecture is defined, in RFC 2637, in order to decouple functions which exist in current Network Access Servers so as to support VPNs. The PPTP uses an enhanced Generic Routing Encapsulation mechanism to provide a flow- and congestion-controlled encapsulated datagram service for carrying PPP packets. The PPTP is designed to run at Open Systems Interconnection (OSI) Layer 2. Layer 2 is the OSI "Data Link" layer and is used to provide reliable transfer of information across a physical link. Tasks performed on the Data Link layer include synchronization, error control and flow control. To be sent on a LAN or wide area network (WAN) link, the payload of an IP packet (i.e., an IP datagram) is encapsulated with a header and trailer for the Data Link layer technology of the outgoing physical interface. For example, if an IP datagram is sent on an Ethernet interface, the IP datagram is encapsulated with an Ethernet header and trailer. When IP datagrams are sent over a point-to-point WAN link, such as in an analog phone network or Integrated Services Digital Network (ISDN), the IP datagram is encapsulated with a PPP header and trailer.

Once the number of endpoints in a given VPN begins to increase, maintaining the given VPN with multiple point to point tunnels may become highly complex. Further, shortcomings of point to point tunneling, that include security threats due to configuration errors and a lack of address separation between the end user IP address space and the carrier IP address space, can become more pronounced.

With regard to the latter of these shortcomings, it is typical for an IP LAN behind a carrier router (i.e., a tunnel endpoint) to have an IP address space that is not meant to be seen by the outside IP world. Such IP addresses may follow a consistent pattern, such as 10.X.X.X. This pattern is often dependent upon the supplier of the networking equipment used to implement the VPN. Hence, by using the same networking equipment, the IP address spaces related to VPNs of different organizations (say, SEARS™ and SPRINT™) may share common addresses. This sharing of common addresses may lead to problems when configuring multiple VPNs over a single carrier network. In particular, a configuration error could lead to packets missing their intended destination in favor of a destination in an unrelated network. For example, a computer behind a carrier router with the VPN identifier 456 may address a packet to a destination with an address of 10.10.2.4 behind a carrier router with the VPN identifier 123. It may be that, due to a configuration error, the packet is sent to a destination with an address of 10.10.2.4 behind a carrier router with the VPN identifier 132.

Consequently, there is a need for a tunneling scheme that can better cope with shared end user IP address spaces, reduces Layer 2 complexity and minimizes security threats due to configuration errors.

SUMMARY OF THE INVENTION

A tunneling scheme optimized for use in virtual private networks provides each tunnel endpoint with two addresses, one private address and one public address. In particular, a tunnel endpoint is stretched over two sub-endpoints, each with an address. An address resolution table at each customer virtual router maintains a mapping between the various addresses of tunnel sub-endpoints.

Advantageously, the present invention provides address separation between the end user address space and the carrier address space. Further, the present invention may reduce Layer 2 complexity in the carrier network. Even further, the present invention overcomes the problem of security threats due to configuration errors.

In accordance with an aspect of the present invention there is provided a method of forwarding a packet to a destination. The method includes examining a header of said packet to determine a private destination address, determining a private address of a private remote sub-endpoint of a tunnel, said private sub-endpoint being associated with said private destination address, determining a public address of a public remote sub-endpoint of said tunnel, encapsulating said packet, resulting in an encapsulated packet, to indicate a public address of a public local sub-endpoint of said tunnel as a source address and said public address of said public remote sub-endpoint of said tunnel as a destination address and forwarding said encapsulated packet to a node in a carrier network. In a further aspect of the present invention, there is provided a software medium that permits a general purpose computer to carry out this method.

In accordance with another aspect of the present invention there is provided a carrier router. The carrier router includes a backbone router including a public network interface for connecting to a public data network and a sub-endpoint for a tunnel having a network address in an address space of said public data network. The carrier router also includes a customer virtual router including a private network interface for connecting to a private data network and a sub-endpoint for said tunnel having a network address in an address space of said private data network.

In accordance with a further aspect of the present invention there is provided a carrier router. The carrier router includes a private network interface, a public network interface and a processor operable to receive a packet at said private network interface, examine a header of said packet to determine a private destination address, determine a private address of a private remote sub-endpoint of a tunnel, said private sub-endpoint being associated with said private destination address, determine a public address of a public remote sub-endpoint of said tunnel, encapsulate said packet, resulting in an encapsulated packet, to indicate a public address of a public local sub-endpoint of said tunnel as a source address and said public address of said public remote sub-endpoint of said tunnel as a destination address and forward said encapsulated packet to a node in a public network via said public network interface.

In accordance with a still further aspect of the present invention there is provided a method of receiving a packet, said packet having public source and destination addresses and private source and destination addresses. The method includes receiving said packet from a node in a carrier data network, forwarding said packet to a first tunnel sub-endpoint having said public destination address, at said first tunnel sub-endpoint, removing said public source and destination addresses from said packet, forwarding said packet to a second tunnel sub-endpoint and at said second tunnel sub-endpoint, forwarding said packet to a device having said private destination address. In a further aspect of the present invention, there is provided a software medium that permits a general purpose computer to carry out this method.

In accordance with an even further aspect of the present invention there is provided a method of adding a given carrier router to a virtual private network, said virtual private network described by a plurality of tunnel definitions, each of said tunnel definitions defining tunnels between sub-endpoints of existing carrier routers. The method includes adding a public network address of a sub-endpoint of said given carrier router as a destination address in each of said plurality of tunnel definitions to create a plurality of amended tunnel definitions and adding a new tunnel definition where said public network address for said sub-endpoint of said given carrier router is a source address in said new tunnel definition and public network addresses for said sub-endpoints of said existing carrier routers are destination addresses in said new tunnel definition. In a further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 6 illustrates a data communications system incorporating a network management console according to an embodiment of the present invention;

FIG. 10 illustrates the data communications system of FIG. 6 with additional detail as present in FIG. 2.

DETAILED DESCRIPTION

Figure 1:
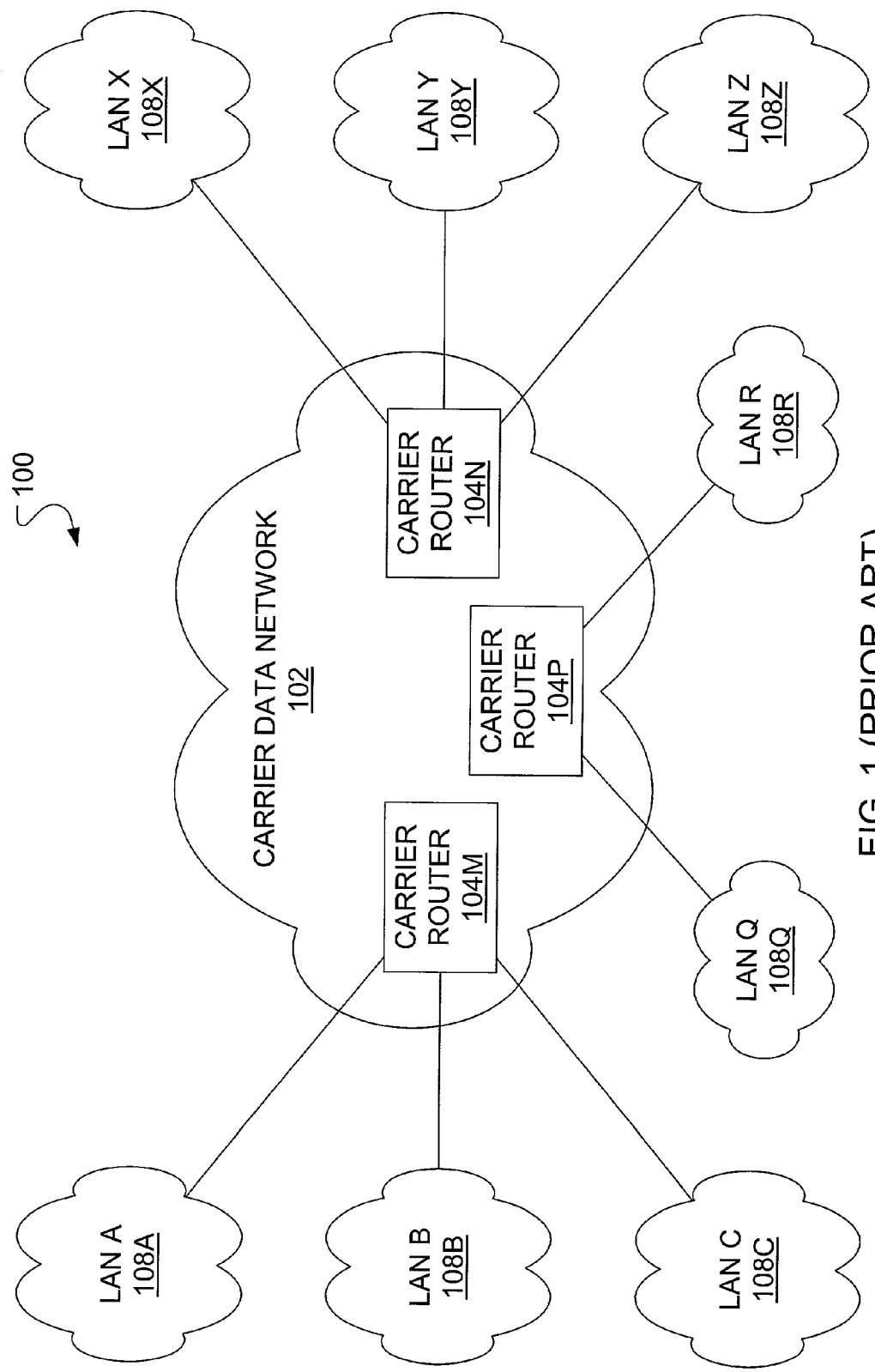
FIG. 1 illustrates a known data communications system.

In FIG. 1, a known communication system 100 includes a carrier data network 102 in which is included a first carrier router 104M, a second carrier router 104N and a third carrier router 104P. The first carrier router 104M connects to a set of local LANs (LAN A 108A, LAN B 108B, LAN C 108C) in a respective local customer address space. The second carrier router 104N connects to a set of remote LANs (LAN X 108X, LAN Y 108Y, LAN Z 108Z) in a respective remote customer address space. The third carrier router 104P connects to a remote LAN Q 108Q and a remote LAN R 108R, each in separate customer address spaces.

Figure 2:
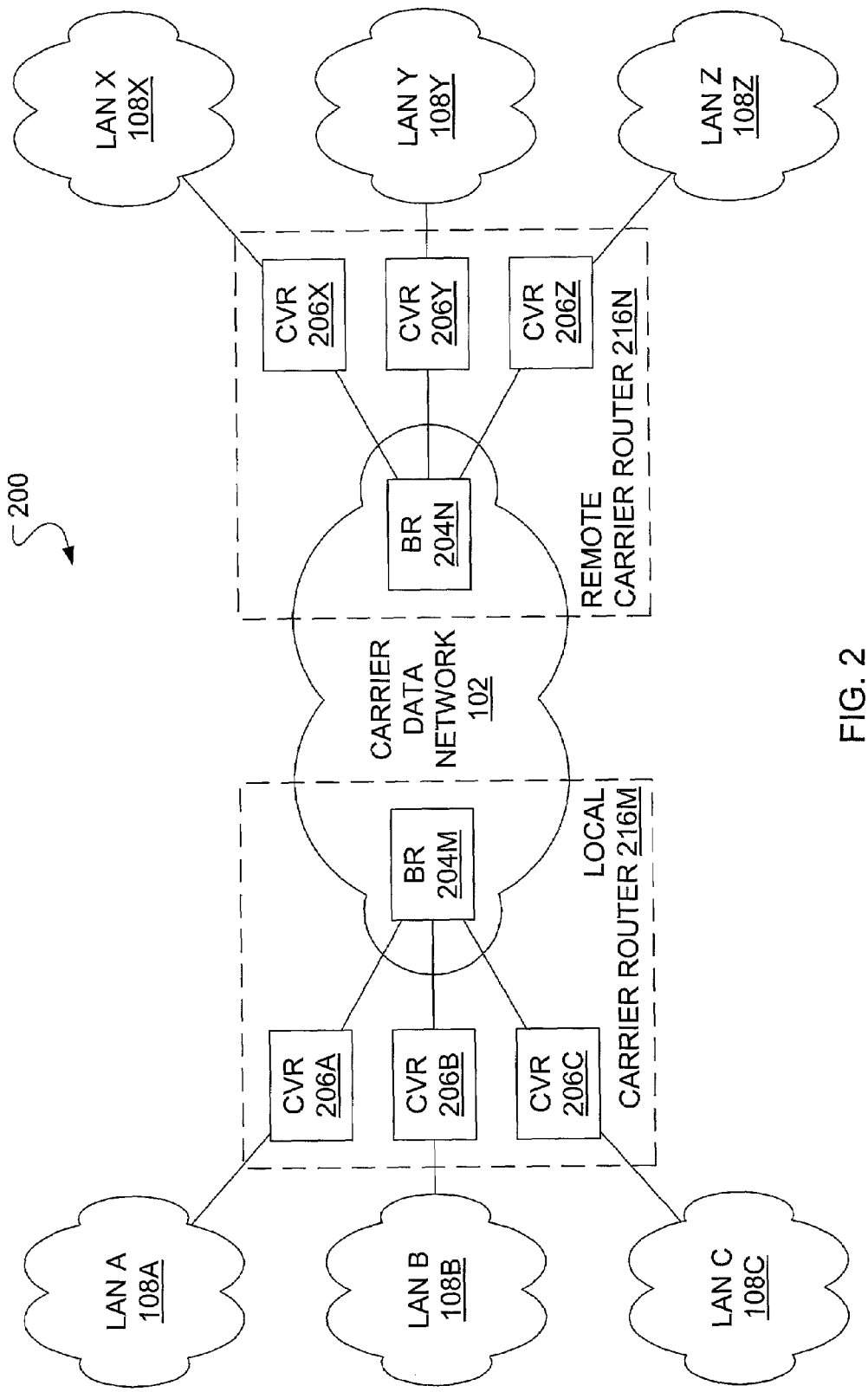
FIG. 2 illustrates a data communications system incorporating an embodiment of the present invention.

In FIG. 2, a communication system 200 includes the carrier data network 102 in which is included a local carrier router 216M and a remote carrier router 216N. The local carrier router 216M includes a local backbone router (BR) 204M and a number of local customer virtual routers 206A, 206B, 206C (referred to individually or collectively as customer virtual routers 206). Each local customer virtual router (CVR) 206 connects to a corresponding local LAN (LAN A 108A, LAN B 108B, LAN C 108C) in a respective local customer address space. The remote carrier router 216N includes a remote backbone router 204N and a number of remote customer virtual routers 206X, 206Y, 206Z. Each remote customer virtual router 206 connects to a corresponding remote LAN (LAN X 108X, LAN Y 108Y, LAN Z 108Z) in a respective remote customer address space.

Figure 3:
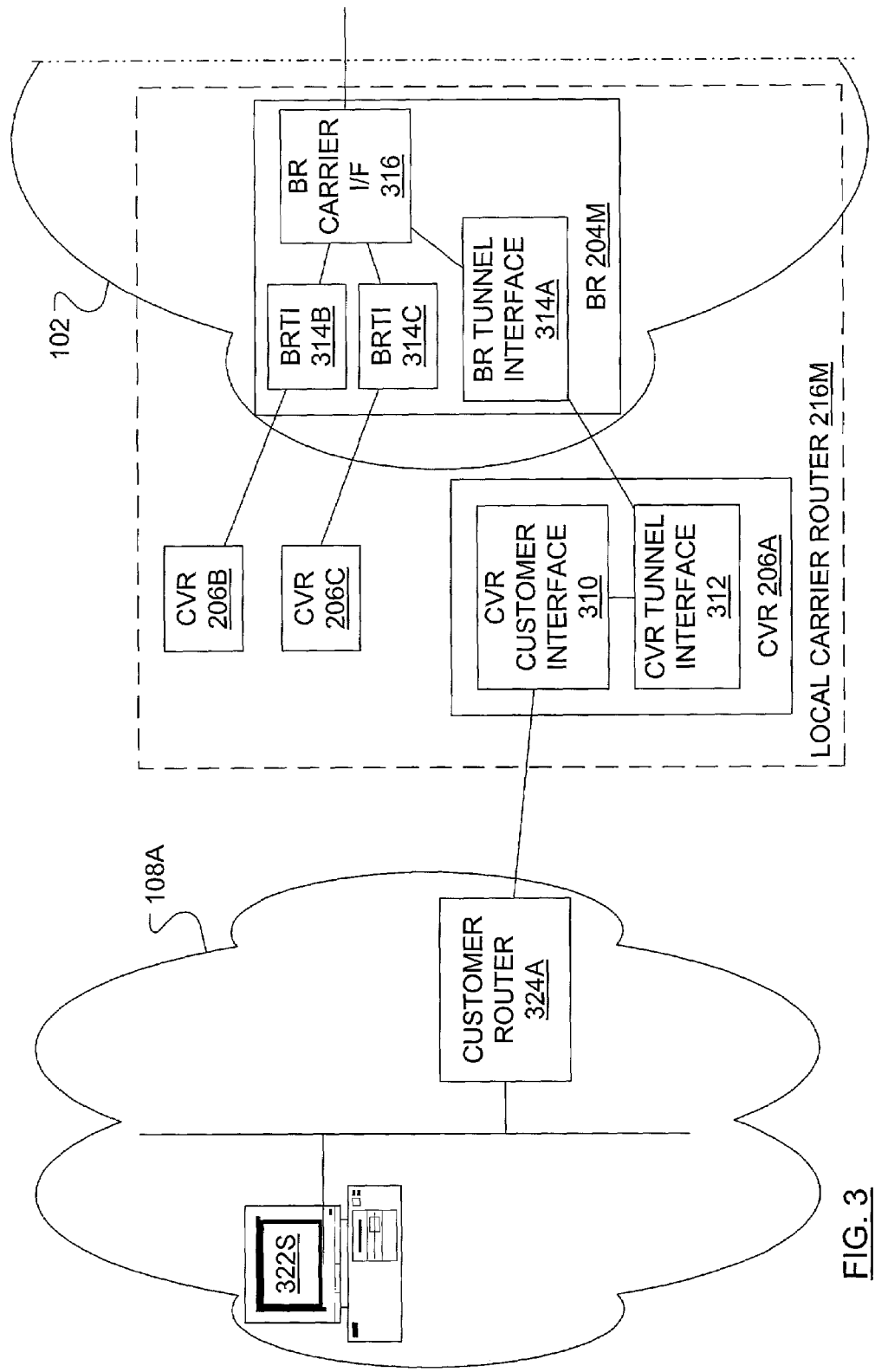
FIG. 3 illustrates a detailed local portion of the network of FIG. 2.

FIG. 3 illustrates a representative packet source 322S connecting to a local customer router 324A in LAN A 108A and subsequently to the local carrier router 216M. The local carrier router 216M includes the local customer virtual router 206A which includes a local CVR customer network interface 310 for receiving the packet from the local customer router 324A. A local CVR tunnel interface 312 connects the local customer virtual router 206A to the local backbone router 204M, specifically, this connection is received by a local BRBR tunnel interface 314A that is subsequently connected to a local BRBR carrier network interface 316. The local BRBR carrier network interface 316 connects the local backbone router 204M to the rest of the carrier data network 102. Also present in the local backbone router 204M are other BR tunnel interfaces 314B, 314C for connecting to other customer virtual routers 206B, 206C.

Figure 4:
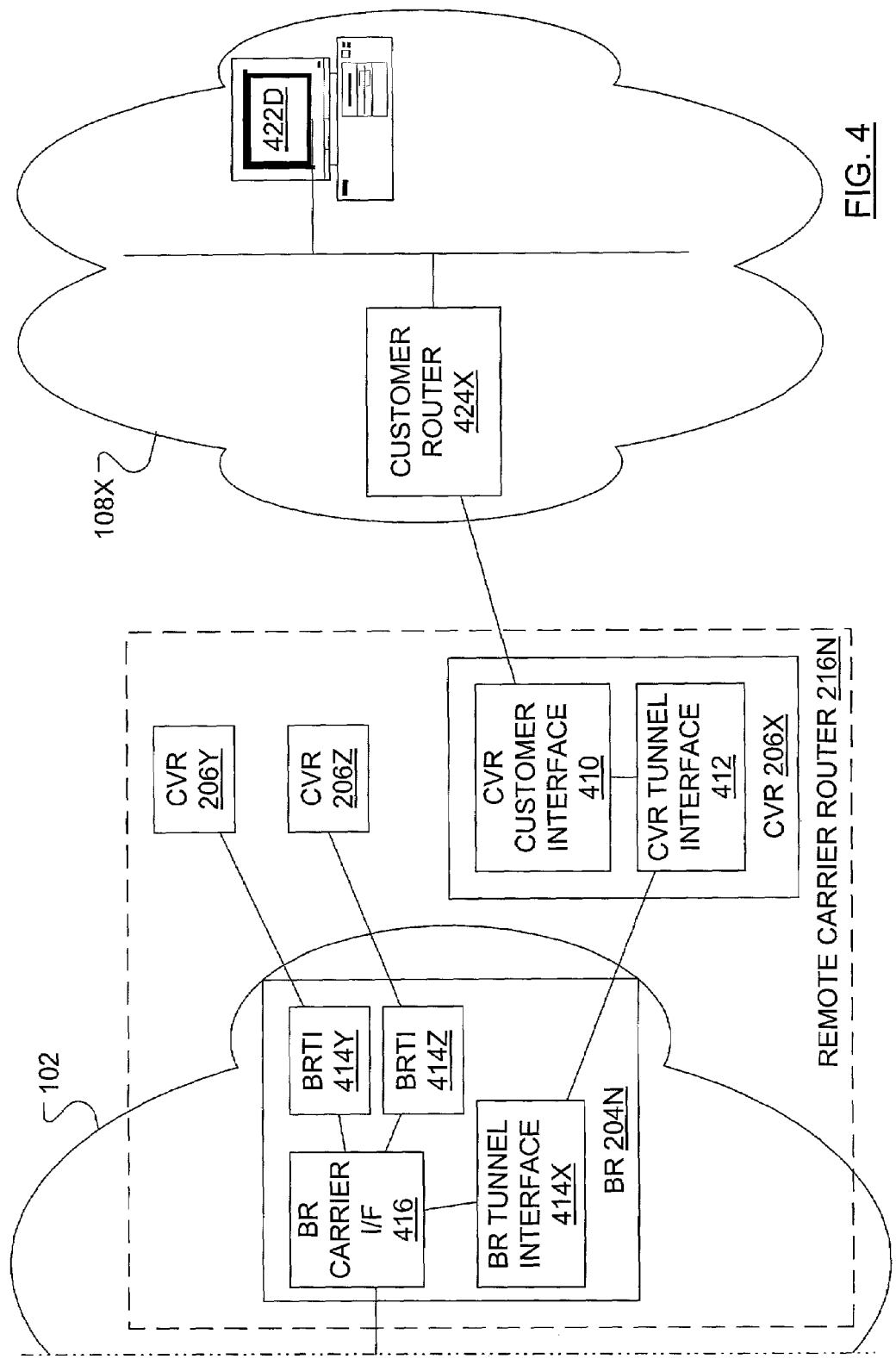
FIG. 4 illustrates a detailed remote portion of the network of FIG. 2.

The remote carrier router 216N, as illustrated in FIG. 4, includes the remote backbone router 204N that includes a remote BR carrier network interface 416 and a remote BR tunnel interface 414X. The remote BR tunnel interface 414X allows a connection between the remote backbone router 204N and a remote customer virtual router 206X. The remote customer virtual router 206X includes a remote CVR tunnel interface 412 connecting to a remote CVR customer network interface 410. Finally, the remote carrier router 216N connects to a representative packet destination 422D via a remote customer router 424X. Also present in the remote backbone router 204N are other BR tunnel interfaces 414Y, 414Z for connecting to other customer virtual routers 206Y, 206Z.

Figure 5:
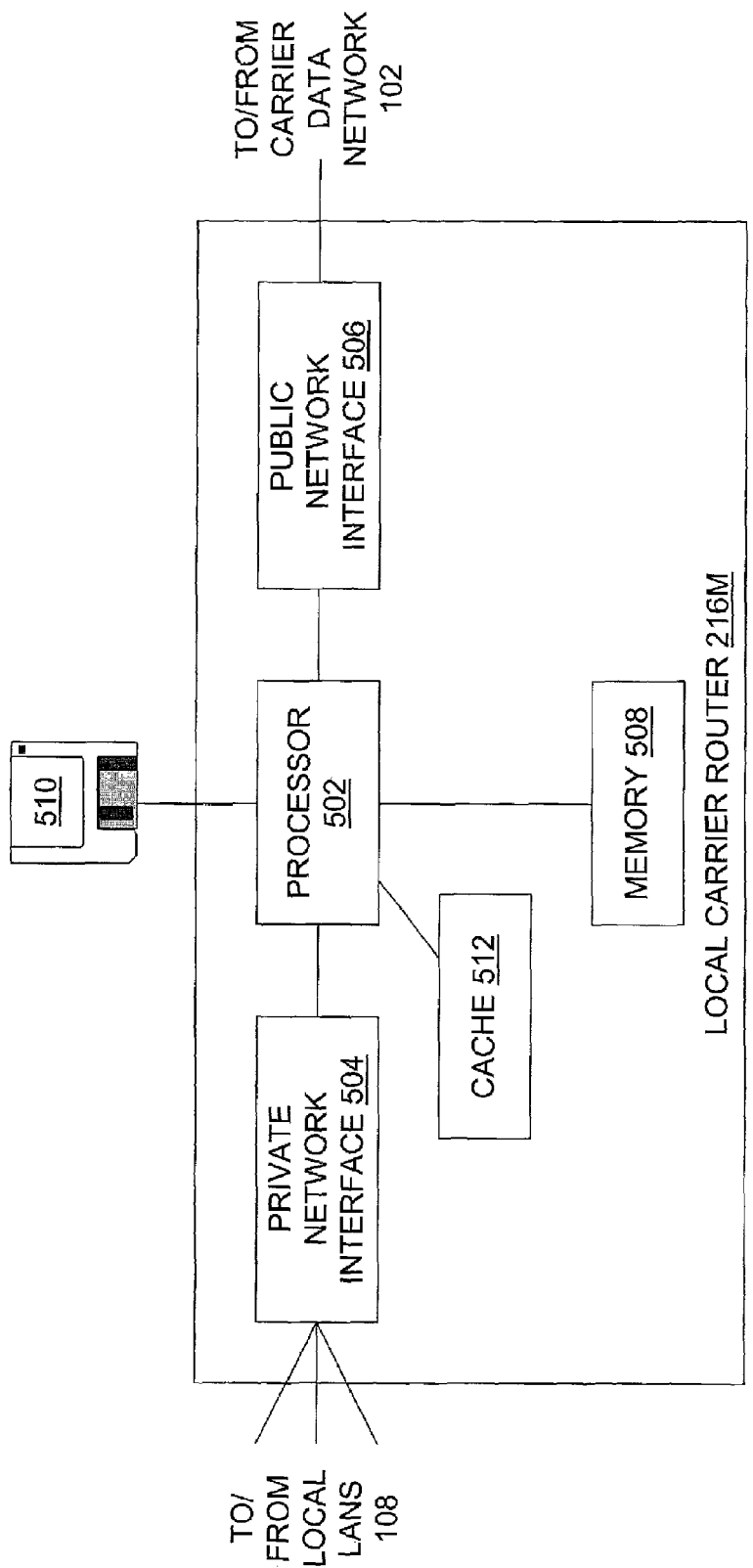
FIG. 5 illustrates details of a carrier router of FIG. 2 according to an embodiment of the present invention.

As will be apparent to a person skilled in the art, the elements of the carrier routers 216, including the customer virtual routers 206 and the backbone routers 204 of FIG. 2, and the parts thereof, illustrated in FIGS. 3 and 4, are not necessarily physically manifested. Instead, the functions of these elements may be implemented, as is customary, in software. FIG. 5 illustrates the local carrier router 216M as an exemplary carrier router. The local carrier router 216M includes a processor 502 connected, for input and output, to a private network interface 504 and a public network interface 506. The processor 502 also has access to a memory 508 and a cache 512. The processor 502 may be loaded with virtual private networking software for executing methods exemplary of this invention from a software medium 510 which could be a disk, a tape, a chip or a random access memory containing a file downloaded from a remote source. The private network interface 504 allows communication between the local carrier router 216M and the local LANs 108 (FIG. 2). Similarly, the public network interface 506 allows communication between the local carrier router 216M and the carrier data network 102.

The architecture of the local carrier router 216M, as shown in FIG. 3, is exemplary of other carrier routers in the communication system 200 of FIG. 2 and includes the local customer virtual router 206A, which is used to connect customer premise equipment to the local carrier router 216M. Also included is the backbone router (BR)BR 204 that is used to aggregate traffic from customer virtual routers 206 for sending over the carrier data network 102. Standard routing protocols are used between the customer virtual routers 206 and the customer premise equipment (in the LAN 108). The known Border Gateway Protocol (e.g., BGP-4) may be used for distributing routing information between customer virtual routers 206. An Interior Gateway Protocol (IGP) may be run between BRs 204. There are two commonly used IGPs: the Routing Information Protocol (RIP) and the Open Shortest Path First (OSPF) protocol.

To implement a traditional VPN using point to point tunnels in the communication system 100 of FIG. 1, the carrier routers 104 manage a set of unidirectional point to point tunnels. For example, a VPN with sites in LAN B 108B, LAN Y 108Y and LAN Q 108Q would require (six) unidirectional point to point tunnels from LAN B 108B to LAN Y 108Y, from LAN Y 108Y to LAN B 108B, from LAN B 108B to LAN Q 108Q, from LAN Q 108Q to LAN B 108B, from LAN Y 108Y to LAN Q 108Q and from LAN Q 108Q to LAN Y 108Y.

When a given packet, originating at a source in LAN Q 108Q arrives at the third carrier router 104P, a table is consulted to associate a destination address, identified in the given packet, with a carrier network address of a carrier router 104 (i.e., one of the first carrier router 104M and the second carrier router 104N). The precise table that is consulted is dependent upon the association of the source with a particular VPN. For example, the table may indicate that the site with the destination address is in LAN B 108B. The third carrier router 104P may then encapsulate the given packet in a new packet with the carrier network address of the first carrier router 104M as the destination address of the new packet and the carrier network address of the third carrier router 104P as the source address of the new packet. The encapsulation of the given packet in the new packet for sending to the first carrier router 104M may be considered placing the given packet in a tunnel that connects the third carrier router 104P to the first carrier router 104M. At the first carrier router 104M, the given packet is extracted from the new packet and forwarded to the LAN that includes the site with the identified destination address, namely LAN B 108B. Note that the terms "first carrier router", "second carrier router" and "third carrier router" used above in relation to carrier routers 104M, 104N and 104P are intended only to nominally distinguish between the carrier routers 104 and not to indicate a time sequence with which a given packet arrives at the carrier routers 104.

Such a mesh of point to point tunnels can begin to become complex when many more VPNs are configured and/or when many more endpoints are added to existing VPNs. Indeed, complexity can be estimated when the relationship among the major components of a given carrier managed VPN are known. The components may include: the average number of sites per VPN (S); the total number of VPNs (V); and the number of carrier routers (N). As long as N<<S*V, the Layer 2 complexity of the carrier data network 102 may be estimated to have the order $O(V*S^2)$.

In a less complex scenario, the carrier data network 102 may support two exemplary traditional VPNs. A first VPN is defined by establishing a tunnel from the first carrier router 104M to the third carrier router 104P and a tunnel from the third carrier router 104P to the first carrier router 104M. A second VPN is defined by establishing a tunnel from the second carrier router 104N to the third carrier router 104P and a tunnel from the third carrier router 104P to the second carrier router 104N. The first VPN may, for instance, be defined to facilitate communications between sites in LAN Q 108Q and LAN B 108B while the second VPN may be defined to facilitate communications between sites in LAN Q 108Q and LAN Y 108Y.

Where the address of a site in LAN B 108B is held in common with a site in LAN Y 108Y, there is potential for an error to be made at the third carrier router 104P. A packet originating at a site in LAN Q 108Q may arrive at the third carrier router 104P and may indicate, as the destination address, the address of the site in LAN B 108B that has an address in common with the site in LAN Y 108Y. The third carrier router 104P then determines a carrier router 104 to which to forward the packet. As described above, this decision is based on an association of the origin of the packet with a particular VPN, and thus a table of associations of destination addresses and carrier router addresses. As stated above, sites in LAN Q 108Q are associated with the first VPN. The definition of VPNs along with their associations with upstream networks may be performed dynamically (i.e., by machine auto-discovery) or statically (i.e., by hand data entry by a network manager). It is in the static definition of VPNs where errors are most likely. If a network manager mistakenly associates sites in LAN Q 108Q with the second VPN, the packet in question will be sent on the tunnel to the second carrier router 104N instead of the tunnel to the first carrier router 104M. At the second carrier router 104N, the original packet will be extracted from the encapsulation. Because LAN Y 108Y includes a site with the destination address of the packet, the packet will be sent to that site, rather than the appropriate site in LAN B 108B.

By dividing the endpoint of a given tunnel (i.e., a carrier router 104) into two sub-endpoints, the tunneling scheme described herein is able to reduce the likelihood of the security threat that can occur in the case of a mis-provisioning of a traditional VPN. The tunneling scheme described herein includes cross-checks that can catch mis-provisioned VPNs before such security threats are allowed to manifest themselves. Furthermore, such endpoint division provides an address separation between the carrier network address space and the customer network address space. As will be apparent hereinafter, a packet is effectively in a tunnel when the packet is given an encapsulating source and destination address. This is in contrast to the traditional approach wherein the process of giving a packet an encapsulating source and destination address is equivalent to sending the packet into a tunnel.

In overview, the tunneling scheme described herein requires two components, namely tunnels, each tunnel having a source address and at least one (potentially more than one) destination address, and a static Address Resolution Protocol (ARP) table. The static ARP table contains information on VPN membership. More particularly, the static ARP table provides address resolution between public and private addresses of tunnel sub-endpoints as well as information on the customer premise equipment (at a site within a LAN) that is assigned to a particular VPN.

Each tunnel endpoint has two addresses, one private (or customer) address and one public (or carrier) address. The private address resides on the customer virtual router 206 and the public address resides on the backbone router 204. Thus, none of the carrier's addresses are known by the end customers and customer addresses can be held in common with carrier addresses.

The static ARP table is created on a per VPN basis and defines a mapping between public and private addresses. An identical static ARP table is distributed to all customer virtual routers 206 in the same VPN. FIG. 6 illustrates a communication system 600 for use with an embodiment of the present invention. Many components should be familiar from preceding FIGS., especially FIG. 2, including the carrier data network 102 including the local carrier router 216M and the remote carrier router 216N. A new carrier router 216P is also included in the carrier data network 102 and connects to LAN Q 108Q. LAN A 108A is shown to connect to the local carrier router 216M. Similarly, LAN X 108X is shown to connect to the remote carrier router 216N.

A network management console 610 is shown to connect to each of the local carrier router 216M, the remote carrier router 216N and the new carrier router 216P. The network management console 610 may be loaded with network management software for executing methods exemplary of this invention from a software medium 610 which, like the software medium 510, could be a disk, a tape, a chip or a random access memory containing a file downloaded from a remote source. Each static ARP table may be created at the network management console 610 by a network management system and then distributed to all the customer virtual routers 206 (resident in the carrier routers 216) within a particular VPN to ensure consistency across the VPN.

Consider, in view of FIGS. 3, 4, 7 and 8, the following example wherein a packet is sent from the packet source 322S with a private source address, corresponding to the packet source 322S, of 10.10.1.1 and a private destination address, corresponding to the packet destination 422D, of 10.20.1.1. (Note that, despite the fact that we are using IP-style addresses in this example, the present invention is not limited to an IP implementation.) An original packet 700A is illustrated in FIG. 7A as including an original header 702A and an original payload 704A. The original header 702A includes an original address field 710A specifically shown to include a private source address 712 and a private destination address 714.

Initially, the local customer router 324A recognizes that the private destination address 714 of the packet is outside of LAN A 108A. The local customer router 324A routes the packet to the local carrier router 216M where the packet is received by the local customer virtual router 206A (step 802). More specifically, the packet is received by the local CVR customer network interface 310. The local CVR customer network interface 310 examines the original header 702A of the packet to read the private destination address 714 (step 804). The local CVR customer network interface 310 then proceeds to look up (step 806) the private destination address 714 (10.20.1.1) in a routing table to learn that the packet should be sent to the remote CVR tunnel interface 412, which is part of the remote carrier router 216N and has an address of 10.1.2.1. The local CVR customer network interface 310 then looks up (step 808) the address of the remote CVR tunnel interface 412 (10.1.2.1) in a forwarding table and finds that, to reach the address 10.1.2.1, the packet must be sent to the local CVR tunnel interface 312, which has an address of 10.1.2.2. Upon receiving the packet, the local CVR tunnel interface 312 performs an ARP look-up (step 810) in the static ARP table.

To be clear, at a given customer virtual router 206, there are three tables: a routing table, a forwarding table and a static ARP table. These tables may be stored in the memory 508 (FIG. 5). In the static ARP table, a public carrier network address of 40.5.3.10 (for the remote BR tunnel interface 414X) is identified as associated with the address (10.1.2.1) of the remote CVR tunnel interface 412. The result of this look up (i.e., 10.1.2.1⇔40.5.3.10) may be stored in the cache 512 so that no more ARP look-ups are required for the remainder of a flow of packets related to this packet, and any further flows of packets with 10.1.2.1 as a customer virtual router destination address.

The static ARP table also includes an indication of the carrier network address for the local BR tunnel interface 314A that is associated with the local CVR tunnel interface 312 (i.e., 10.1.2.2⇔40.5.2.10). Typically, however, this address information is close at hand for the local CVR tunnel interface 312 and does not require an ARP table look-up.

Figure 7A:
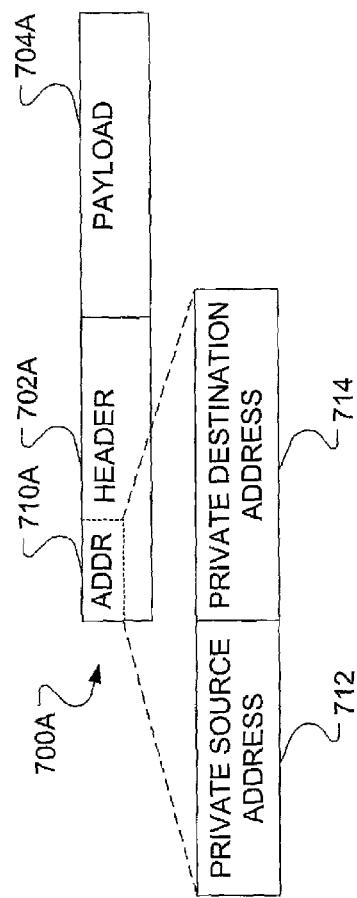
FIG. 7A illustrates an original packet.
Figure 7B:
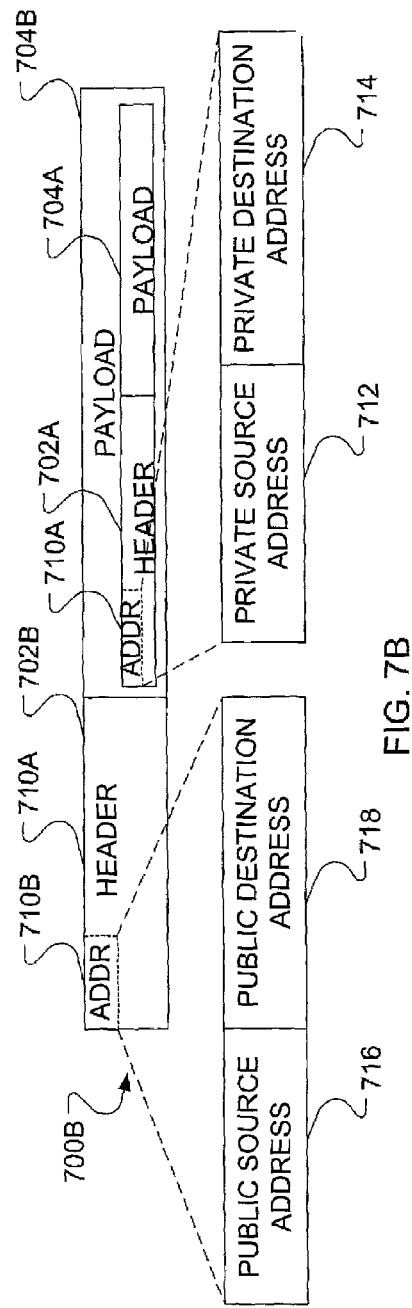
FIG. 7B illustrates an encapsulated version of the original packet of FIG. 7A.
Figure 8:
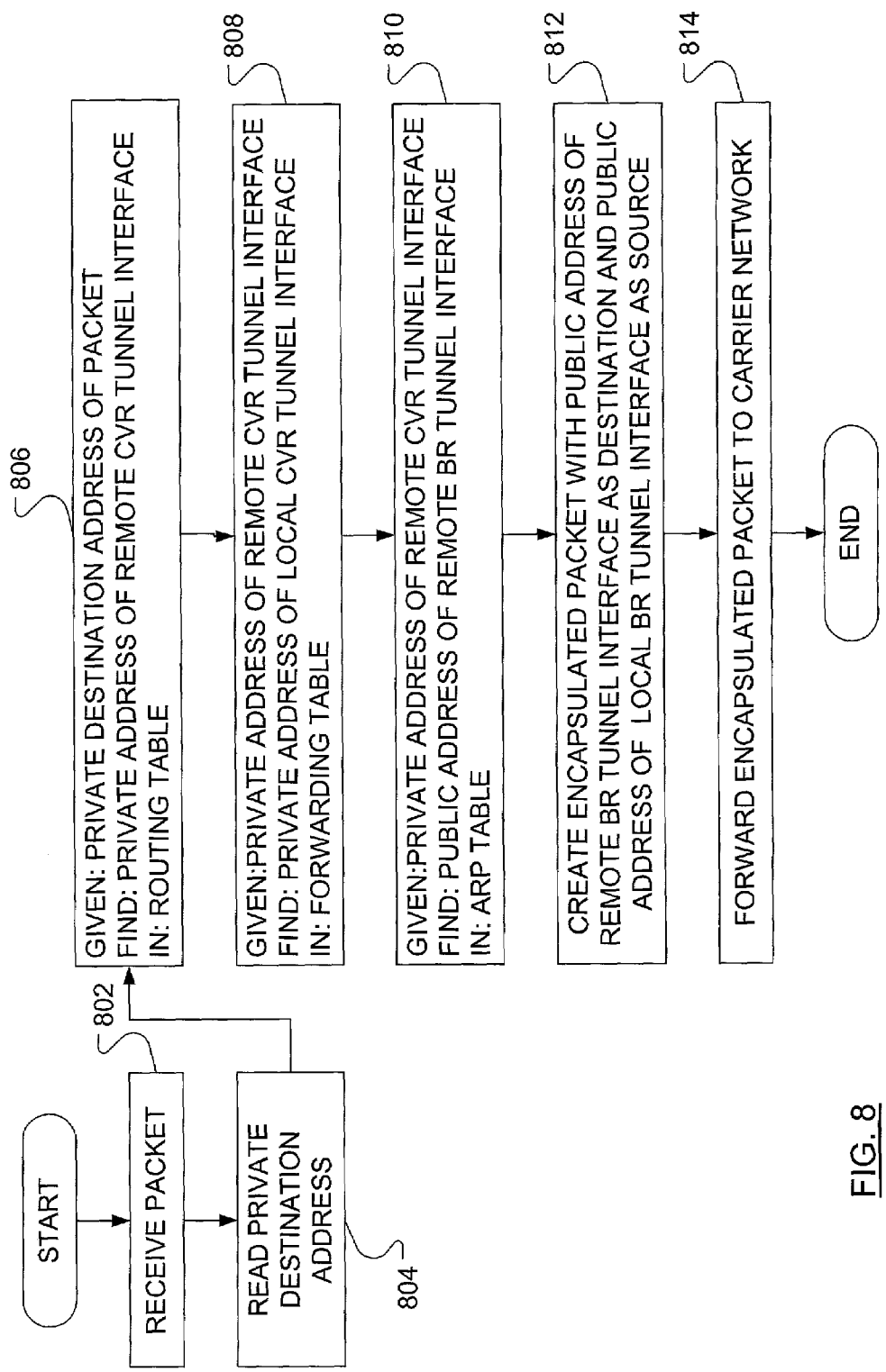
FIG. 8 illustrates steps of a method of forwarding a packet into a tunnel according to an embodiment of the present invention.
Figure 9:
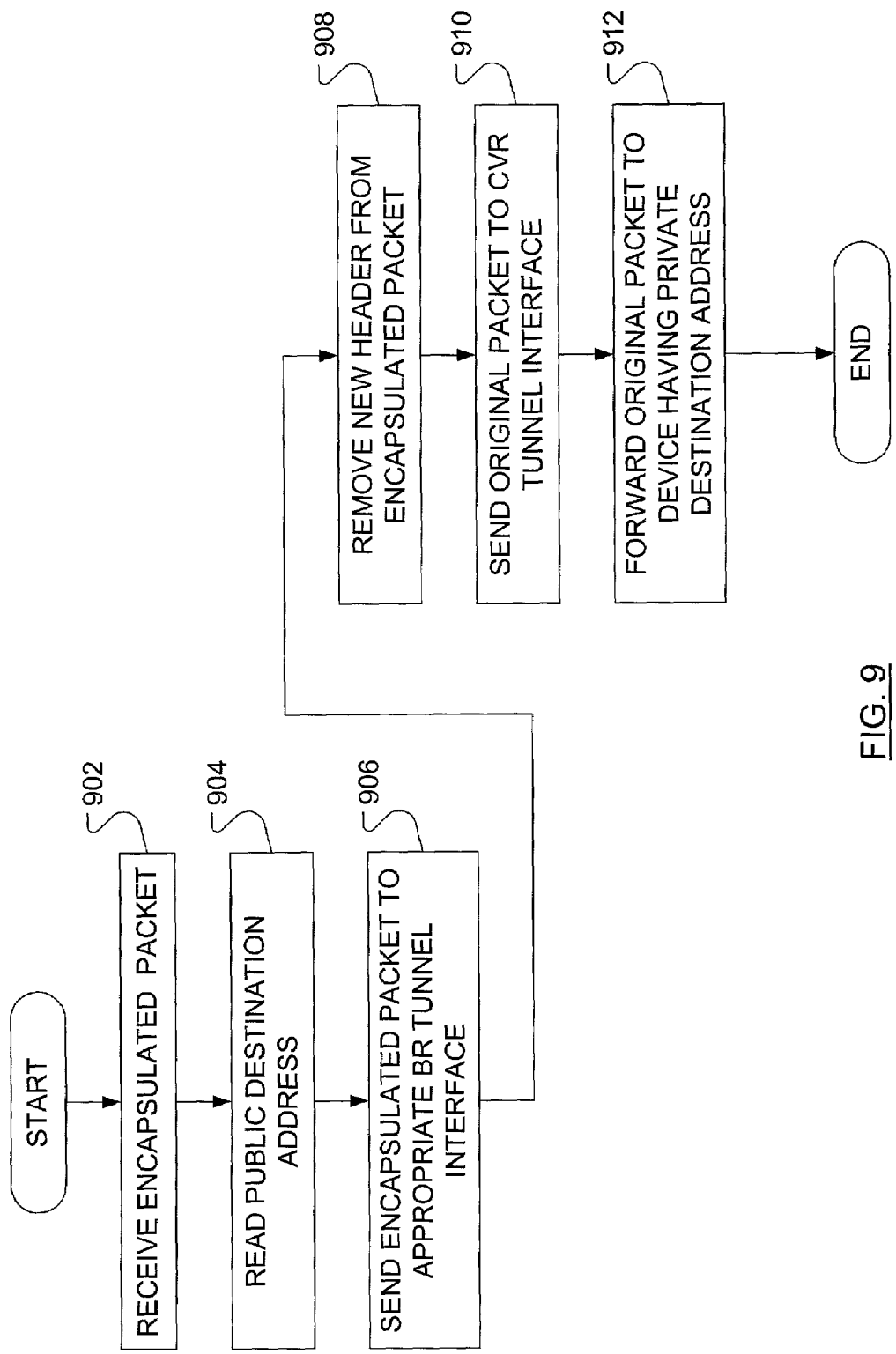
FIG. 9 illustrates steps of a method of receiving a packet from a tunnel according to an embodiment of the present invention.

The packet may then be encapsulated, by the local CVR tunnel interface 312 with a public source address and a public destination address that are both in the address space of the carrier data network 102, to result in an encapsulated packet (step 812). An exemplary encapsulated packet 700B is illustrated in FIG. 7B as including a new header 702B and a new payload 704B. The new header 702B includes a new address field 710B specifically shown to include a public source address 716 and a public destination address 718. The new payload 704B includes the original address field 710A, which includes the private source address 712 and the private destination address 714, as well as the original payload 704A. The public source address 716 used in the new address field 710B is the address of the local BR tunnel interface 314A (40.5.2.10) while the public destination address 718 used is the address of the remote BR tunnel interface 414X (40.5.3.10).

The encapsulated packet 700B is then forwarded (step 814) through the local BR carrier interface 316, across the carrier data network 102 to arrive at the remote BR carrier interface 416. Notably, each of the BR carrier interfaces 316, 416 have distinct carrier network addresses and maintain routing tables. In particular, the local BR carrier interface 316, with an address, for this example, of 40.5.1.1, may maintain a routing table that indicates that a packet destined for 40.5.3.10 (the remote BR tunnel interface 414X) should be sent toward 40.5.1.2 (the remote BR carrier interface 416). It may be that a direct link to 40.5.1.2 is not available. However, the routing table may indicate the address of a "next hop" to which to forward the packet. At the next hop, another routing table will be consulted, as is conventional, and a subsequent next hop toward 40.5.1.2 may be identified, etc.

Upon receipt of the encapsulated packet 700B (step 902), the remote BR carrier interface 416 may read the public destination address of the packet (step 904) and send the encapsulated packet 700B to the remote BR tunnel interface 414X (step 906) having that address. As will be apparent to a person skilled in the art, where the carrier router 216N has multiple CVRs, as illustrated in FIG. 2, the backbone router 204N will have a corresponding number of BR tunnel interfaces. At the remote BR tunnel interface 414X, the encapsulated packet 700B is recognized as such. The public source address 716 and the public destination address 718, and the rest of the new header 710B, are removed from the encapsulated packet 700B by the remote BR tunnel interface 414X (step 908). The original packet 700A is then sent to the remote CVR tunnel interface 412 (step 910). The remote CVR tunnel interface 412 examines the original address field 710A and determines that the private destination address 714, corresponding to the packet destination 422D, is 10.20.1.1. The original packet 700A is then sent (step 912), via the remote CVR customer interface 410 and the remote customer router 424X, to the packet destination 422D.

In sum then, instead of the case in FIG. 1 wherein a tunnel endpoint is a carrier router 104 and the address of the carrier router 104 may also be used by customer premise equipment and other carrier routers 104, a tunnel endpoint in the herein proposed tunneling scheme is stretched between two sub-endpoints, namely the local BR tunnel interface 314A and the local CVR tunnel interface 312. The presence of two sub-endpoints allows for two addresses. The advantage of two address is that one address can be in the address space of a customer while the other address can be in the address space of the carrier.

It is also worth noting that the CVR customer interface 310 effectively places the packet into a tunnel by determining to forward the packet to the CVR tunnel interface 312. It is at the CVR tunnel interface 312 that encapsulating address information is added to the packet. The field of addresses available for use, at the CVR tunnel interface 312, as an encapsulation destination address is limited to the public addresses in the ARP table. This is in contrast to the traditional approach to tunneling for virtual private networks wherein encapsulation and placing the packet into a tunnel are equivalent and the field of addresses available for use, at a carrier router 104, as an encapsulation destination address may only be limited by the valid addresses in the Internet (or other carrier data network).

Consider now, in view of FIG. 10, the task of the network management system when adding a new site to an existing VPN. Where the existing VPN is designed to connect the local customer virtual router 206A, with CVR tunnel interface (not shown) having a private address of 10.1.1.1, to the remote customer virtual router 206X, with CVR tunnel interface (not shown) having a private address of 10.1.1.2, two tunnels will have been provisioned. These tunnels may be defined by a tunnel definition that includes a name, a source address and at least one destination address, for example, Tunnel1(SA:40.1.1.1, DA:40.1.2.1) and Tunnel2 (SA:40.1.2.1, DA:40.1.1.1), where 40.1.1.1 is the public address of the related BR tunnel interface (not shown) at the local BR 206M and 40.1.2.1 is the public address of the related BR tunnel interface (not shown) at the remote BR 206N. The pre-existing VPN will also have an associated ARP table with the following entries:

| Private Address | | Public Address |
|---|---|---|
| 10.1.1.1 | ←→ | 40.1.1.1 |
| 10.1.1.2 | ←→ | 40.1.2.1 |

Initially, a new customer virtual router 206Q is added to the structure of the new carrier router 216P. A CVR tunnel interface (not shown) of the new customer virtual router 206Q is then given a private address (10.1.1.3). The new private address may be in the same subnet as the other private addresses in the pre-existing VPN so that the new customer virtual router 206Q may be reached by a broadcast, but this is not a necessity. A BR tunnel interface (not shown) of the new customer virtual router 206Q is given a public address (40.1.3.1). Notably, this public address need not be in the same subnet as the other BR tunnel interface public addresses. As is conventional, the assignment of addresses to these sub-endpoints may be accomplished by appropriate network mangers (i.e., people) given the task of assigning new addresses or by an automatic process of network address assignment. This automatic process may be, for instance, performed by a Dynamic Host Configuration Protocol (DHCP) server or a Windows Internet Naming Service (WINS) server, as is known. Notably, the assignment of the private address to the CVR tunnel interface is likely to be handled within the customer network (LAN Q 108Q) while the assignment of the public address to the BR tunnel interface is likely to be handled within the carrier data network 102.

Subsequently, the existing tunnel definitions that define the pre-existing VPN at the local customer virtual router 206A and the remote customer virtual router 206X may be re-provisioned to add a new public destination address. In particular, the tunnel definitions become Tunnel1(SA: 40.1.1.1, DA:40.1.2.1, DA:40.1.3.1) and Tunnel2(SA: 40.1.2.1, DA:40.1.1.1, DA:40.1.3.1). At the new customer virtual router 206Q, a new tunnel is provisioned with a tunnel definition as Tunnel3(SA:40.1.3.1, DA:40.1.1.1, DA:40.1.2.1).

The static ARP table for the pre-existing VPN may then be updated and distributed to all customer virtual routers 206 by a management console, such the management console 610 (FIG. 6). For this example, the updated ARP table will have the following entries:

| Private Address | | Public Address |
|---|---|---|
| 10.1.1.1 | ←→ | 40.1.1.1 |
| 10.1.1.2 | ←→ | 40.1.2.1 |
| 10.1.1.3 | ←→ | 40.1.3.1 |

The task of provisioning tunnels in a VPN and updating static ARP tables may be either performed statically (i.e., by a person) or dynamically (i.e., by a network management system). As mentioned above with respect to convention VPN maintenance using point-to-point tunnels, static provisioning can lead to errors, especially as a particular VPN becomes increasingly complex.

To guard against the mis-provisioning of tunnels, the local carrier router 216M may perform a cross check of the public addresses in the tunnel configuration against the static ARP table to identify any errors before a tunnel service is activated. For instance, consider a particular point to multipoint tunnel provisioned to have a source address of 40.1.1.2 and two destination addresses, 40.2.1.2 and 40.3.1.1. The local carrier router 216M attempts to validate that the addresses of the provisioned tunnel are present in the ARP table. If the ARP table appears as follows:

| Private Address | | Public Address |
|---|---|---|
| 10.1.2.1 | ←→ | 40.1.1.2 |
| 10.1.2.2 | ←→ | 40.2.1.2 |
| 10.1.2.3 | ←→ | 40.3.1.2 | then the provisioning of the tunnel may be identified as flawed. In particular, the destination address 40.3.1.1 is not in the ARP table. When such mis-provisioning is identified by the local carrier router 216M, the local carrier router 216M may communicate the error to the management console 610 (FIG. 6). Such management consoles are typically monitored by human network managers. Alternatively, if a console is connected directly to the local carrier router 216M, the local carrier router 216M may notify a user of that console. Even if a network manager is unavailable to receive immediate notification of a mis-provisioning, a message describing the error may be recorded to a log.

Although, the tunneling scheme disclosed herein may appear to increase complexity, such is only the case when the number of VPNs and sites therein are limited. One advantage of the herein proposed tunneling scheme is a reduction in Layer 2 complexity for carrier data networks supporting multiple VPNs. Consider the communication system of FIG. 1 having three carrier routers 104. If these three carrier routers 104 support ten VPNs averaging three sites per VPN (i.e., N=4, S=10, V=1000), the Layer 2 complexity of such a system may be estimated to be of order $O((1000 \times 10^2)) = O(100,000)$. It is proposed that the complexity of the herein described tunneling scheme is of order $O(N^2)$, which computes to order $O(4^2) = O(16)$ for the present example.

Advantageously, the network management aspect of the herein described tunneling scheme allows single site provisioning and multi-site distribution of VPNs. Furthermore, the ability is granted to deploy IP-VPNs today without later re-engineering the carrier data network 102 to accommodate Multi Protocol Label Switching (MPLS). The present scheme also significantly reduces the possibility of security threats due to configuration errors, a common problem with other IP-VPN solutions.

Other modifications will be apparent to those skilled in the art and, therefore, the invention is defined in the claims.

We claim:

1. A method of forwarding a packet to a destination comprising:
    examining a header of said packet to determine a private destination address;
    determining a private address of a private remote sub-endpoint of a tunnel, said private sub-endpoint being associated with said private destination address:
    determining a public address of a public remote sub-endpoint of said tunnel;
    encapsulating said packet, resulting in an encapsulated packet, to indicate a public address of a public local sub-endpoint of said tunnel as a source address and said public address of said public remote sub-endpoint of said tunnel as a destination address; and
    forwarding said encapsulated packet to a node in a carrier network.

2. The method of claim 1 wherein said tunnel is a point to a multipoint tunnel.

3. The method of claim 1 wherein said determining said private address of said private remote sub-endpoint of said tunnel comprises consulting a routing table to discover an address associated with said private destination address of said packet.

4. The method of claim 1 wherein said determining said public address of said public remote sub-endpoint of said tunnel comprises consulting a static address resolution protocol table to discover an address associated with said private address of said private remote sub-endpoint of said tunnel.

5. The method of claim 1 further comprising determining a private address of a first local sub-endpoint of said tunnel.

6. The method of claim 5 wherein said determining said private address of said first local sub-endpoint of said tunnel comprises consulting a forwarding table to discover an address associated with said private address of said private remote sub-endpoint of said tunnel.

7. A carrier router comprising:
    a private network interface;
    a public network interface;
    a processor operable to:
        receive a packet at said private network interface;
        examine a header of said packet to determine a private destination address;
        determine a private address of a private remote sub-endpoint of a tunnel, said private sub end-point being associated with said private destination address;
        determine a public address of a public remote sub-endpoint of said tunnel;
        encapsulate said packet, resulting in an encapsulated packet, to indicate a public address of a public local sub-endpoint of said tunnel as a source address and said public address of said public remote sub-endpoint of said tunnel as a destination address; and forward said encapsulated packet to a node in a public network via said public network interface.

8. A computer readable medium containing computer executable instructions which, when performed by a processor in a carrier router, cause the processor to:

examine a header of a packet to determine a private destination address;

determine a private address of a private remote sub-endpoint of a tunnel, said private sub-endpoint being associated with said private destination address;

determine a public address of a public remote sub-endpoint of said tunnel;

encapsulate said packet, resulting in an encapsulated packet, to indicate a public address of a public local sub-endpoint of said tunnel as a source address and said public address of said public remote sub-endpoint of said tunnel as a destination address; and forward said encapsulated packet to a node in a carrier network.

* * * * *